(12) United States Patent
Shraga et al.

(10) Patent No.: US 6,888,846 B2
(45) Date of Patent: May 3, 2005

(54) DATA TRANSFER IN AN OPTICAL NETWORK COMMUNICATION SYSTEM

(75) Inventors: Eyal Shraga, Kfar Saba (IL); Oren Marmur, Kiryat-Ono (IL); Ilan Ron, Kfar Saba (IL)

(73) Assignee: Flexlight Networks, Kfar Saba (IL)

( * ) Notice: Subject to any disclaimer, the term of this patent is extended or adjusted under 35 U.S.C. 154(b) by 91 days.

(21) Appl. No.: 10/194,569

(22) Filed: Jul. 11, 2002

(65) Prior Publication Data

US 2004/0202484 A1 Oct. 14, 2004

(51) Int. Cl.[7] .......................... H04L 12/28; H04L 12/56; H04J 3/26; H04J 4/00; H04J 10/00
(52) U.S. Cl. ...................... 370/466; 370/395; 370/432; 370/470; 398/72; 398/168
(58) Field of Search ................................ 370/395, 396, 370/432, 470, 471, 473, 475, 509, 458, 466; 359/118, 125, 167, 168, 169, 170, 171, 110; 398/17, 175, 182, 72, 168, 183

(56) References Cited

U.S. PATENT DOCUMENTS

| | | | | |
|---|---|---|---|---|
| 5,299,044 A | * | 3/1994 | Mosch et al. ................. 359/110 |
| 5,477,364 A | * | 12/1995 | Pearson ........................ 359/139 |
| 5,509,003 A | * | 4/1996 | Snijders et al. .............. 370/294 |
| 5,528,592 A | | 6/1996 | Schibler et al. |
| 5,572,349 A | * | 11/1996 | Hale et al. ................... 359/137 |
| 5,598,410 A | | 1/1997 | Stone |
| 5,687,014 A | * | 11/1997 | Czerwiec et al. .............. 398/75 |
| 5,699,178 A | * | 12/1997 | Ostlund ........................ 398/95 |
| 5,793,770 A | | 8/1998 | St. John et al. |
| 5,805,591 A | | 9/1998 | Naboulsi et al. |
| 5,864,413 A | * | 1/1999 | Feldman et al. .............. 359/125 |
| 5,978,374 A | * | 11/1999 | Ghaibeh et al. ............. 370/395 |
| 6,005,865 A | | 12/1999 | Lewis et al. |
| 6,023,467 A | * | 2/2000 | Abdelhamid et al. ........ 370/395 |
| 6,101,013 A | | 8/2000 | Monacos |
| 6,181,695 B1 | | 1/2001 | Curry et al. |
| 6,181,710 B1 | | 1/2001 | Cooper et al. |
| 6,211,978 B1 | * | 4/2001 | Wojtunik ........................ 398/9 |
| 6,233,261 B1 | * | 5/2001 | Mesh et al. .................... 372/32 |
| 6,347,096 B1 | * | 2/2002 | Profumo et al. ............ 370/476 |
| 6,421,151 B1 | * | 7/2002 | Berger et al. ................. 398/79 |
| 6,512,614 B1 | | 1/2003 | Saleh et al. |
| 6,519,255 B1 | | 2/2003 | Graves |
| 6,546,014 B1 | * | 4/2003 | Kramer et al. .............. 370/395 |
| 6,574,391 B2 | * | 6/2003 | Augustsson ................... 385/24 |
| 6,607,311 B1 | | 8/2003 | Fishman et al. |
| 6,625,161 B1 | * | 9/2003 | Su et al. ...................... 370/415 |
| 6,636,527 B1 | * | 10/2003 | Lee et al. .................... 370/465 |
| 6,643,294 B1 | * | 11/2003 | Cooperman et al. ........ 370/413 |
| 6,668,139 B2 | * | 12/2003 | Meli et al. ................... 398/173 |

OTHER PUBLICATIONS

U.S. Appl. No. 10/016,584, filed Dec. 5, 2001, entitled: "Optical Network Communication System".

* cited by examiner

*Primary Examiner*—Man U. Phan
(74) *Attorney, Agent, or Firm*—Blakely Sokoloff Taylor & Zafman

(57) ABSTRACT

Communications apparatus, including client interface units (CIUs) coupled to network service lines for sending and receiving data carried by the service lines in accordance with respective communication protocols. The CIUs include at least first and second CIUs that communicate with respective first and second channels of the data operating in accordance with different, respective first and second protocols. The apparatus includes optical interface units (OIUs), coupled to a passive optical network (PON) and modulating optical radiation responsive to the data so as to convey the data over the PON.

The apparatus further includes a connectivity unit which conveys the data between the CIUs and the OIUs, while mapping the channels to the OIUs so that data from the first and second channels is carried in alternation by one of the OIUs to first and second users of the PON communicating respectively according to the first and second protocols.

34 Claims, 4 Drawing Sheets

DATA TRANSFER IN AN OPTICAL NETWORK COMMUNICATION SYSTEM

FIELD OF THE INVENTION

The present invention relates generally to data transfer, and specifically to multi-channel data being transferred via a plurality of wavelengths in an optical network.

BACKGROUND OF THE INVENTION

A point-to-multi-point passive optical network (PON) operates as a communication system by broadcasting optical signals downstream from a central unit, herein termed an optical line termination (OLT), to optical network terminations (ONTs). The signals are transferred from the OLT to the ONTs via fibre optic cables and passive optical splitters, which comprise the physical fabric of the network. For upstream communication, each ONT must be able to transmit signals which are not interfered with by other ONTs.

One of the methods known in the art for performing such upstream and downstream transmissions is by using time division multiple access (TDMA), wherein each ONT is allocated a window when only it can transmit, and where the OLT also has windows for transmission to specific ONTs. Other methods for avoiding interference include transmitting signals at different wavelengths, using wavelength division multiple access (WDMA). Combinations of TDMA and WDMA are also known in the art. Signals are typically transmitted within the PON according to an protocol based on these methods. Upstream of the OLT, signals are typically transferred via an industry-standard data transmission protocol, such as an Ethernet protocol.

As demand on transmission networks increases, the need for improving the flexibility of the networks also increases. One way in which network flexibility may be increased is by enabling elements of the network to convey data via more than one protocol.

SUMMARY OF THE INVENTION

It is an object of some aspects of the present invention to provide apparatus and a method for distributing data channels transmitted according to a plurality of protocols via a passive optical network (PON).

In a preferred embodiment of the present invention, an optical line termination (OLT) communicates at its upstream side with data service lines, each line operating according to a respective industry-standard protocol. Each line is able to transfer a set of data channels, and is coupled to the OLT via one of a first plurality of channel interface (CIF) cards comprised in the OLT.

At its downstream side the OLT communicates with the PON via a second plurality of optical interface (OIF) cards, each of which conveys one or more of the data channels between the PON and the OIF card by modulation of optical radiation. The OIF cards are able to convey the data channels regardless of the protocol of the channels. For each OIF card, one of a pair of wavelengths is used for downstream transmission, the other wavelength of the pair being used for upstream transmission.

A connectivity unit in the OLT couples the CIF cards and the OIF cards. The connectivity unit is implemented so that any CIF card and any OIF card may be coupled, so as to transfer one or more data channels between the CIF and OIF cards. The implementation is preferably performed by a main central processor (MCP) in the OLT, and may be performed in a dynamic manner, irrespective of the protocol of the data channels. Enabling variable routing of data channels between any CIF card and any OIF card, regardless of the protocol, allows extremely flexible channel assignment configurations, and enables high bandwidth levels for transmitted channels.

In order to transfer downstream data from different channels via the connectivity unit, the data from each CIF card is buffered by channel in a respective memory as it enters the connectivity unit, and its destination OIF card is also identified in the respective memory. The MCP performs a series of steps wherein data from each CIF card is read, in units of a size set by management software controlling the data transfer. The data is routed through the connectivity unit to an OIF memory for the OIF card assigned to the channel, then stored in the OIF memory for subsequent downstream transmission. During the routing and storage, channel boundaries are inserted and then removed as necessary, as the data is transferred.

A similar process is performed by the MCP in transferring upstream data from a specific OIF card to a CIF card assigned to the channel.

The connectivity unit is also implemented to enable local "cross-connection" of channels within the PON via the OIF cards. Thus, an upstream channel signal received by one OIF card may be "looped-back" by the connectivity unit to a downstream channel, via a different OIF card. The ability to cross-connect channels by looping signals back allows flexibly defined virtual local area networks (VLANs) to be implemented between the ONTs coupled to the PON.

There is therefore provided, according to a preferred embodiment of the present invention, communications apparatus, including:

a first plurality of client interface units, adapted to be coupled to network service lines so as to send and receive data carried by the service lines in accordance with respective communication protocols, the client interface units including at least first and second client interface units that are adapted to communicate with respective first and second channels of the data operating in accordance with different, respective first and second protocols;

a second plurality of optical interface units, adapted to be coupled to a passive optical network (PON) and to modulate optical radiation responsive to the data so as to convey the data over the PON; and a connectivity unit, coupled to convey the data between the client interface units and the optical interface units, while mapping the channels to the optical interface units so that data from the first and second channels is carried in alternation by one of the optical interface units to first and second users of the passive optical network communicating respectively in accordance with the first and second protocols.

Preferably, each of the optical interface units is adapted to convey the data from the first and the second channels from the first and the second users of the passive optical network, and the connectivity unit is adapted to map the first channel to the first client interface unit and the second channel to the second client interface unit.

Preferably, each of the communication protocols comprises a respective industry-standard communication protocol.

Preferably, the data is transferred in the PON via a time division multiplexed method.

Preferably, each of the optical interface units conveys the data via a respective pair of wavelengths, so that the data is transferred in the PON by a wavelength division multiplexed method.

Preferably, the connectivity unit includes a first plurality of memories which are adapted to store routing information for channels of the data sent and received by respective client interface units.

Further preferably, each of the first plurality of memories includes a downstream label memory adapted to store the routing information indicative of the optical interface unit, included in the second plurality of units, to which downstream data included in the channels of the data is to be sent.

Preferably, the connectivity unit includes a second plurality of memories which are adapted to store routing information for channels of the data sent and received by respective optical interface units.

Further preferably, each of the second plurality of memories includes an upstream label memory adapted to store the routing information indicative of the client interface unit, included in the first plurality of units, to which upstream data included in the channels of the data is to be sent.

Preferably, the connectivity unit includes a memory including management software, wherein the management software is adapted to convey the data between the client interface units and the optical interface units in data-units having a predetermined minimum size.

Further preferably, the management software is adapted to insert channel boundaries in the conveyed data and to remove the channel boundaries after the data has been conveyed.

Preferably, the second plurality of optical interface units includes a first optical interface unit and a second optical interface unit, and the connectivity unit is coupled to convey upstream data included in the data from the first optical interface unit as downstream data to the second interface unit, and the upstream and downstream data are included in an identical channel.

There is further provided, according to a preferred embodiment of the present invention, a method for transferring data, including:

providing a first plurality of client interface units, adapted to be coupled to network service lines so as to send and receive the data carried by the service lines in accordance with respective communication protocols, the client interface units including at least first and second client interface units that are adapted to communicate with respective first and second channels of the data operating in accordance with different, respective first and second protocols;

providing a second plurality of optical interface units, adapted to be coupled to a passive optical network (PON) and to modulate optical radiation responsive to the data so as to convey the data over the PON;

coupling a connectivity unit between the client interface units and the optical interface units so as to convey the data therebetween; and mapping the channels to the optical interface units so that data from the first and second channels is carried, via the connectivity unit, in alternation by one of the optical interface units to first and second users of the passive optical network communicating respectively in accordance with the first and second protocols.

Preferably, each of the optical interface units is adapted to convey the data from the first and the second channels from the first and the second users of the passive optical network, and the connectivity unit is adapted to map the first channel to the first client interface unit and the second channel to the second client interface unit.

Preferably, each of the communication protocols includes a respective industry-standard communication protocol.

Preferably, the method includes transferring the data in the PON via a time division multiplexed method.

Preferably, each of the optical interface units conveys the data via a respective pair of wavelengths, and the method includes transferring the data in the PON by a wavelength division multiplexed method.

Preferably, the connectivity unit includes a first plurality of memories, and the method includes comprising storing routing information for channels of the data sent and received by client interface units in the respective memories.

Further preferably, each of the first plurality of memories includes a downstream label memory adapted to store the routing information indicative of the optical interface unit, included in the second plurality of units, to which downstream data included in the channels of the data is to be sent.

Preferably, the connectivity unit includes a second plurality of memories, and the method includes storing routing information for channels of the data sent and received by optical interface units in the respective memories.

Further preferably, each of the second plurality of memories includes an upstream label memory adapted to store the routing information indicative of the client interface unit, included in the first plurality of units, to which upstream data included in the channels of the data is to be sent.

Preferably, the connectivity unit includes a memory comprising management software, and the method includes conveying the data between the client interface units and the optical interface units in data-units having a minimum size determined by the management software.

Further preferably, the method includes the management software inserting channel boundaries in the conveyed data and removing the channel boundaries after the data has been conveyed.

Preferably, the second plurality of optical interface units includes a first optical interface unit and a second optical interface unit, and the method includes conveying, via the connectivity unit, upstream data included in the data from the first optical interface unit as downstream data to the second interface unit, wherein the upstream and downstream data are included in an identical channel.

There is further provided, according to a preferred embodiment of the present invention, communications apparatus, including:

a first plurality of client interface units, adapted to be coupled to network service lines so as to send and receive data carried by the service lines in accordance with respective communication protocols, the client interface units including at least first and second client interface units that are adapted to communicate with respective first and second channels of the data operating in accordance with different, respective first and second protocols;

a second plurality of network interface units, adapted to be coupled to a data transfer network and to convey the data over the network; and a connectivity unit, coupled to convey the data between the client interface units and the network interface units, while mapping the channels to the network interface units so that data from the first and second channels is carried in alternation by one of the network interface units to first and second users of the data transfer network communicating respectively in accordance with the first and second protocols.

There is further provided, according to a preferred embodiment of the present invention, a method for transferring data, including:

providing a first plurality of client interface units, adapted to be coupled to network service lines so as to send and receive the data carried by the service lines in accordance with respective communication protocols, the client interface units including at least first and second client interface units that are adapted to communicate with respective first and second channels of the data operating in accordance with different, respective first and second protocols;

providing a second plurality of network interface units, adapted to be coupled to a data transfer network and to convey the data over the network;

coupling a connectivity unit between the client interface units and the network interface units so as to convey the data therebetween; and mapping the channels to the network interface units so that data from the first and second channels is carried, via the connectivity unit, in alternation by one of the network interface units to first and second users of the data transfer network communicating respectively in accordance with the first and second protocols.

The present invention will be more fully understood from the following detailed description of the preferred embodiments thereof, taken together with the drawings, in which:

DETAILED DESCRIPTION OF PREFERRED EMBODIMENTS

Figure 1:
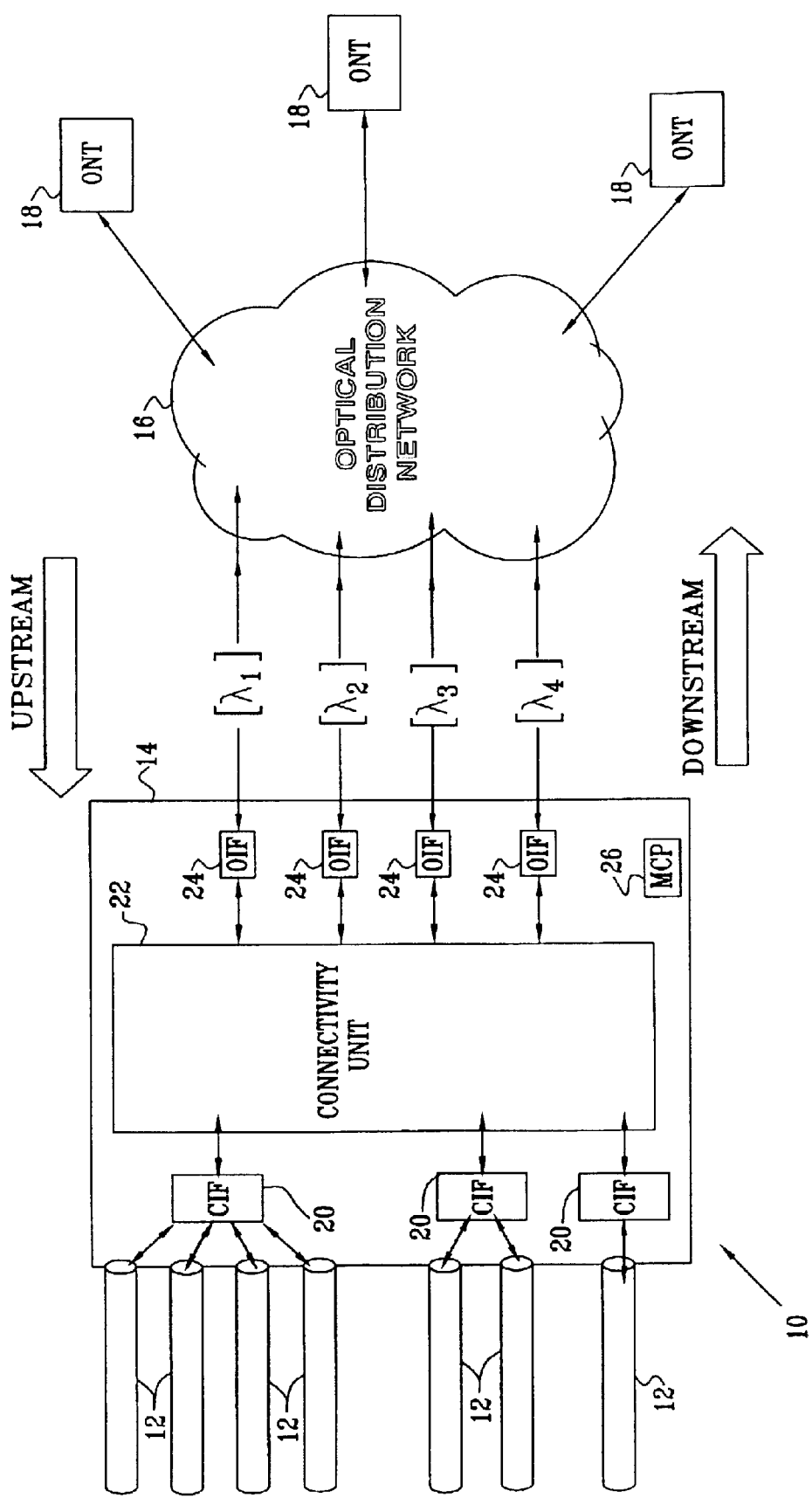
FIG. 1 is a schematic diagram illustrating a layout of an optical distribution system, according to a preferred embodiment of the present invention.

Reference is now made to FIG. 1, which is a schematic diagram illustrating a layout of an optical distribution system 10, according to a preferred embodiment of the present invention. System 10 comprises generally similar service lines 12, each of the service lines being able to transfer data according to an industry-standard protocol. For example, a first service line 12 may comprise a coaxial cable adapted to transfer Ethernet data-frames at 10 Mbit/s or higher rates; a second service line 12 may comprise a twisted wire pair adapted to transfer data-frames at rates of the order of 1 Gbit/s; and a third service line 12 may comprise an optical fiber transmitting data-frames according to a Synchronous Optical Network (SONET) standard. Other types of lines and other methods for transferring data will be familiar to those skilled in the art; all such types and methods are considered to be within the scope of the present invention.

Service lines 12 are coupled to an optical line termination (OLT) 14 which is able to receive downstream data from service lines 12, and which is able to transmit upstream data to the service lines. OLT 14 conveys downstream data received from service lines 12 to a passive optical network (PON) 16, and conveys upstream data received from PON 16 to the service lines. The OLT acts as a central transmission point and an overall controlling device for system 10. Data is conveyed between OLT 14 and PON 16 by one or more fiber optic lines using a plurality of discrete wavelength groups $[\lambda_1]$, $[\lambda_2]$, $[\lambda_3]$, $[\lambda_4]$, . . . . Each wavelength group comprises a first wavelength at which OLT 14 transmits the downstream data for the group and a second wavelength at which the OLT receives the upstream data for the group. Thus, data is transferred within PON 16 by a wavelength division multiplexed method. PON 16 is terminated at its downstream side by generally similar optical network terminations (ONTs) 18 acting as respective receiving end points, each ONT 18 operating at one of the wavelength groups. Each ONT 18 then distributes received data to one or more end users, each end user receiving the data according to one of the protocols transmitted by service line 12. Each ONT 18 preferably also acts as a collection point for data transmitted upstream by respective end users of the ONT.

Most preferably, for each wavelength group, data transfers between OLT 14 and ONTs 18 by a dynamically varying time division multiplexed (TDM) method. A detailed description of such a method is given in U.S. patent application Ser. No. 10/016,584, which is assigned to the assignee of the present application and which is incorporated herein by reference. Alternatively, data for each wavelength group transfers between OLT 14 and ONTs 18 by another TDM method known in the art.

OLT 14 comprises a first plurality of generally similar client interface (CIF) units 20, each unit being coupled to one or more service lines 12 via one or more ports. Typically, each port comprises a different physical connection. By way of example in system 10, four service lines 12 are coupled by four ports to a first CIF unit 20, two service lines 12 are coupled by two ports to a second CIF unit 20, and one service line 12 is coupled to a third CIF unit 20. It will be appreciated that each CIF unit 20 may be coupled to virtually any number of service lines. Each CIF unit 20 operates to transfer data between its respective service lines and OLT 14, and is preferably implemented as a printed circuit card. It will be appreciated that each CIF unit 20 may be implemented by other means known in the art, such as one or more application specific integrated circuits. Hereinbelow, CIF units 20 are also referred to as CIF cards 20.

OLT 14 also comprises a second plurality of generally similar optical interface (OIF) units 24, each OIF unit 24 transferring data between OLT 14 and network 16 for one of the wavelength groups $[\lambda_1]$ $[\lambda_2]$, $[\lambda_3]$, $[\lambda_4]$, . . . . Preferably, each OIF unit 24 transfers its wavelength group to and from network 16 using one fiber optic. Alternatively, each OIF unit 24 transfers its wavelength group to and from network 16 using two separate fiber optics. As for the CIF units, each OIF unit 24 is preferably implemented as a printed circuit card, or alternatively by other means known in the art, such as one or more application specific integrated circuits. Hereinbelow, OIF units 24 are also referred to as OIF cards 24.

Each CIF card 20 is implemented to operate in the industry-standard formats of the service lines to which the card is connected, examples of which are given above. Each CIF card 20 acts as a data buffer, both for upstream and downstream data. Each CIF card 20 also acts as a data transducer between its one or more service lines and the OLT. Similarly, each OIF card 24 acts as a data buffer for upstream and downstream data. Each OIF card 24 also acts as a transducer converting between optical and electronic signals. For upstream data flow each OIF card 24 functions as a first element in directing data for a specific channel upstream to one of CIF cards 20, each CIF card 20 acting as a receiver of the upstream data before transmitting the data on its coupled service line(s) 12. For downstream data flow, each CIF card 20 functions as a first element in directing data for a specific channel downstream to one of OIF cards 24, each OIF card 24 acting as a receiver of the downstream data before transmitting the data on its respective downstream wavelength. Data is transferred between CIF cards 20 and OIF cards 24 via a connectivity unit 22 in OLT 14. Connectivity unit 22 is preferably implemented as a printed circuit card. Alternatively, connectivity unit 22 may be implemented by any other means known in the art. Further details of the operation of CIF cards 20 and OIF cards 24 and of connectivity unit 22 are described below. OLT 14 most preferably comprises a main central processor (MCP) 26, which acts as an overall controller for transfer of data between CIF cards 20 and OIF cards 24.

Figure 2:
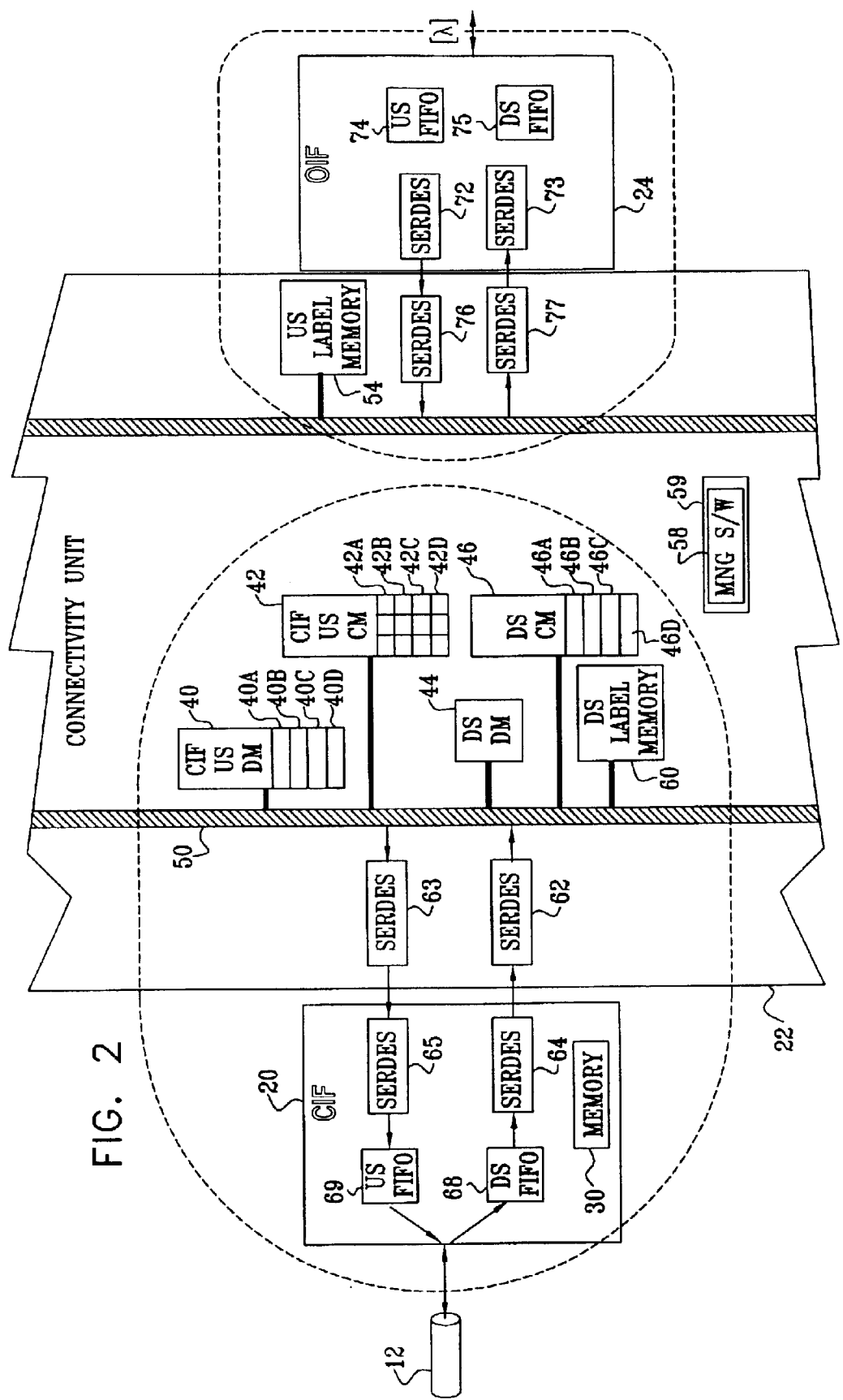
FIG. 2 is a schematic diagram showing structure of a section of an optical line termination (OLT) in the system of FIG. 1, according to a preferred embodiment of the present invention.

FIG. 2 is a schematic diagram showing structure of a section of OLT 14, according to a preferred embodiment of the present invention. For clarity, only one CIF card 20 and sets of elements used by the CIF card are shown in FIG. 2, and the one CIF card 20 is assumed to be coupled to one service line 12. Similarly, only one OIF card 24 and sets of elements used by the OIF card are shown. It will be appreciated that OLT 14 comprises substantially similar sets of elements for each CIF card 20 and each OIF card 24 comprised in OLT 14. Each CIF card 20 and each OIF card 24 is coupled to a bus 50 comprised in connectivity unit 22. MCP 26 is also coupled to bus 50.

For each CIF card 20 there is an upstream data memory (DM) 40 in unit 22, DM 40 being sub-divided into zones 40A, 40B, 40C, and 40D which are dedicated to wavelength groups $[\lambda_1]$, $[\lambda_2]$, $[\lambda_3]$, $[\lambda_4]$ respectively. Unit 22 also comprises, for each CIF card 20, an upstream channel memory (CM) 42, a downstream DM 44, a downstream label memory 60, and a downstream CM 46. Upstream CM 42 is sub-divided into zones 42A, 42B, 42C, and 42D, and downstream CM 46 is sub-divided into zones 46A, 46B, 46C, and 46D, the zones corresponding to the wavelength groups $[\lambda_1]$, $[\lambda_2]$, $[\lambda_3]$, $[\lambda_4]$ respectively. Each CIF card 20 comprises an upstream first-in first-out (FIFO) memory 69 for upstream data storage, and upstream serializer-deserializer (SERDES) logic 65 for transferring the data. Each CIF card 20 also comprises a downstream FIFO memory 68 and downstream SERDES logic 64 for transferring downstream data. Unit 22 comprises an upstream SERDES logic 63 and a downstream SERDES logic 62 for each CIF card 20. Each SERDES logic 63 communicates with its corresponding SERDES logic 65, and each SERDES logic 64 communicates with its corresponding SERDES logic 62.

For each OIF card 24 there is an upstream label memory 54 in unit 22. Unit 22 also comprises an upstream SERDES logic 76 and a downstream SERDES logic 77 for each OIF card 24. Each OIF card 24 comprises an upstream FIFO memory 74 and upstream SERDES logic 72. Each OIF card 24 also comprises a downstream FIFO memory 75 and downstream SERDES logic 73. Each SERDES logic 72 communicates with its corresponding SERDES logic 76, and each SERDES logic 77 communicates with its corresponding SERDES logic 73.

It will be appreciated that methods, other than methods using SERDES logic units described herein, may be used for transferring data. For example, data may be transferred substantially directly, with no translation between serial and parallel and vice versa. All such methods are considered to be comprised within the scope of the present invention.

OLT 14 uses its CIF cards 20, OIF cards 24, and connectivity unit 22 to route channels between any service line 12 and any OIF card 24, i.e., any wavelength group. The routing of each channel is implemented according to a service level agreement between a provider of data of the channel and an operator of system 10, when the channel is initially set up for transmission within the system. The routing may be changed by the operator at a later time. The operator stores the routing in each upstream label memory 54 and each downstream label memory 60, using management software 58 comprised in a memory 59 of connectivity unit 22. The stored routing enables any channel to be routed between any CIF card 20 and any OIF card 24.

Figure 3:
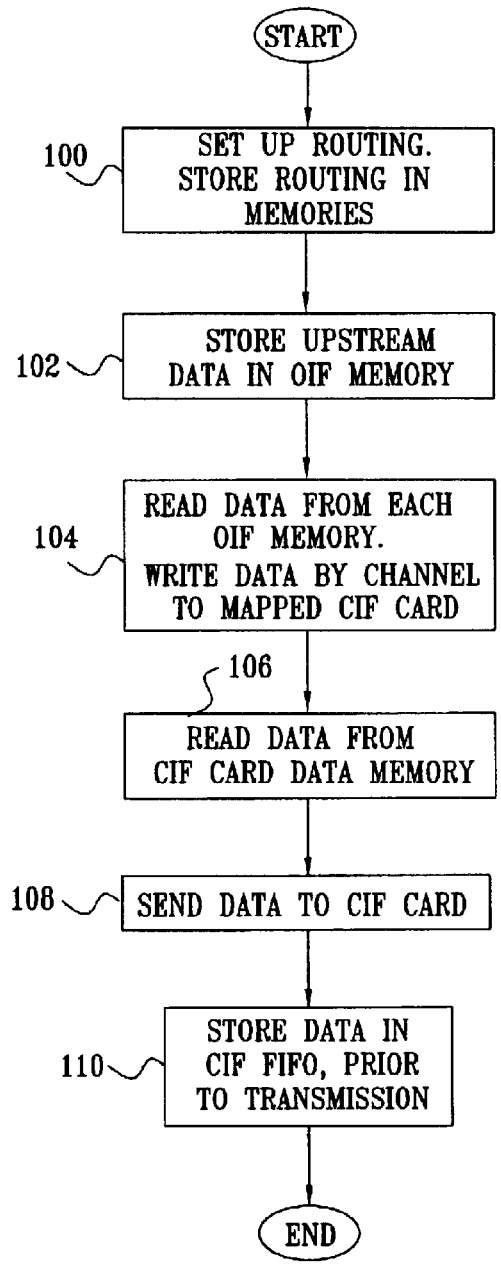
FIG. 3 is a flowchart showing how data is transferred in an upstream direction from optical interface (OIF) cards in the OLT to client interface (CIF) cards in the OLT, according to a preferred embodiment of the present invention.

FIG. 3 is a flowchart showing how data is transferred in an upstream direction from OIF cards 24 to CIF cards 20, according to a preferred embodiment of the present invention. In an initial step 100 the operator of system 10 sets up a routing for each channel using software 58, so that MCP 26 will be aware of which CIF card 20 and which OIF card 24 is to be used for each channel. For each OIF card 24 the routing is entered into respective upstream label memory 54, which stores a label for each channel transmitted by the wavelength group of the card, and a mapping between the channels and their CIF card 20s. The label is attached to data of a specific channel when data for that channel is transmitted (from downstream ONTs 18), and is used as an identifier of the channel. Also, labels for each channel transmitted by each CIF card 20 are stored in respective memories 30 of the cards.

In a second step 102, upstream data arriving at each OIF card 24 is entered into the respective upstream FIFO memory 74 for the card. The upstream data is identified by channel according to the label attached to the data. The upstream data is then transferred out of each memory 74 by respective SERDES logic 72 in card 24, via the corresponding SERDES logic 76, to bus 50, boundaries being inserted between channels.

In a third step 104, connectivity unit 22 reads the transferred upstream data from each OIF card 24 and writes the data to its mapped CIF card, according to the label on the data and according to the mapping that was stored in each respective label memory 54. The data is written into the appropriate section of each CIF upstream data memory 40, e.g., for data read from OIF card 24 corresponding to wavelength group $[\lambda_2]$, the data is written into zone 40B of memory 40 of the specific CIF card 20 determined by label memory 54. Unit 22 reads the data from each OIF card 24 in units having a predetermined minimum size, preferably four bytes, the size being set by software 58, although software 58 may be used to set any other convenient unit size.

Substantially in parallel with writing into each data memory 40, connectivity unit 22 writes start and end addresses for the data into the appropriate zone in each channel memory 42. Thus, for the example described above, start and end addresses in data memory 40 are written into zone 42B.

In a fourth step 106, unit 22 reads data sequentially from data memory 40 for a specific CIF card 20, until all data memory 40 is cleared.

In a fifth step 108, data read from the specific data memory 40 is sent to the corresponding CIF card 20, using SERDES logic 63 to convert the data to a serial form and then transfer the data. Boundaries between the channels read from data memory 40 are inserted into the serial data, and the channel data is also sent with its corresponding channel label.

In a final step 110, each CIF card 20 receives its serial data. The data is converted in SERDES logic 65, the channel boundaries are removed, and labels are recovered from the converted parallel data. Each recovered channel label is compared with labels stored in a memory 30 of the specific CIF card 20, and when the labels correspond, the data is written, according to channel, into the upstream FIFO memory 69 comprised in the card.

Figure 4:
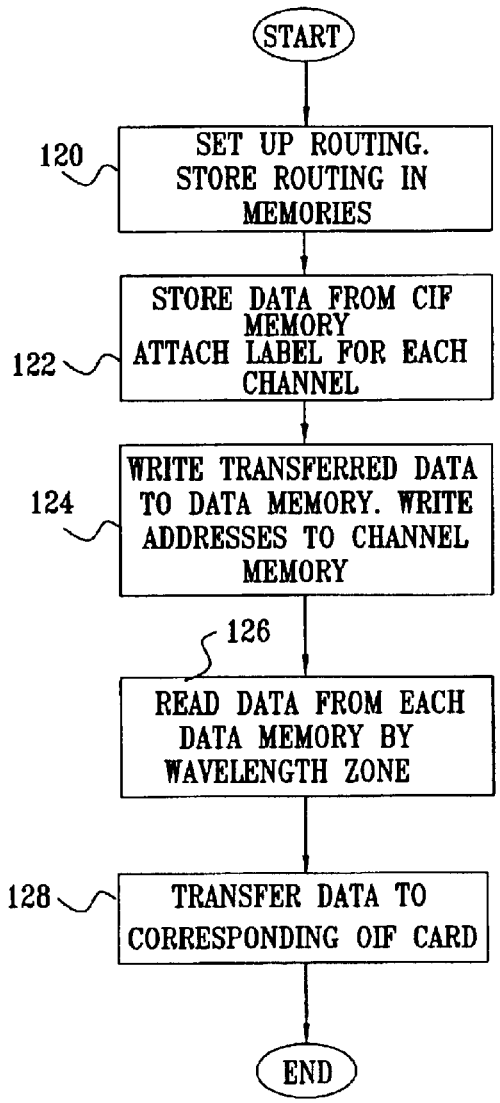
FIG. 4 is a flowchart showing how data is transferred in a downstream direction from CIF cards to OIF cards, according to a preferred embodiment of the present invention.

FIG. 4 is a flowchart showing how data is transferred in a downstream direction from CIF cards 20 to OIF cards 24, according to a preferred embodiment of the present invention. In an initial step 120, downstream routing and a label for each channel transmitted via each CIF card 20 is stored in downstream label memory 60 of the respective card, using software 58. The routing stored in each memory 60 indicates the OIF card 24 to which each channel from the CIF card is to be sent. Software 58 also provides the labels to each respective CIF card 20.

In a second step 122, downstream data arriving at each CIF card 20 is entered into the respective downstream FIFO 68 for the card. A label, chosen from those provided by software 58 to the specific CIF card 20, is attached to each channel of the downstream data. The downstream data is then transferred out of each memory 68 by the respective SERDES logic 64 in card 20, via SERDES logic 62, to bus 50.

In a third step 124, unit 22 writes the transferred data to the respective downstream data memory 44 of the CIF card. Substantially as the downstream data is written, unit 22 writes start and end addresses of each channel into one of zones 46A, 46B, 46C, or 46D of downstream channel memory 46. The zone is determined from label memory 60.

In a fourth step 126, data for a specific OIF card 24 is read from the appropriate zone of each data memory 44 of each CIF card 20 until all data for the zone has been read. The data is then placed on bus 50, for subsequent transfer to the OIF card 24 corresponding to the zone.

In a final step 128, downstream data directed to a specific OIF card 24 is transferred from bus 50 via the respective SERDES logics 76, and the SERDES logic 72 of the OIF card. Channel boundaries are introduced and removed by the SERDES logics, substantially as described above for step 110.

It will be appreciated that initial steps 100 and 120, for the flowcharts of FIGS. 3 and 4, may be performed at substantially any time during operation of system 10, for example, in the case of the system operator needing to update routing of one or more channels, introduce new channels to the system, or delete existing channels from the system. It will further be appreciated that downstream data from a particular CIF card 20 may be multicast to more than one OIF card 24, by the system operator making appropriate entries in channel memory 46 and/or label memory 60.

It will be understood that system 10 enables a data channel to be transferred between any CIF card 20 supporting the protocol of the data channel and any OIF card 24 and its corresponding wavelength group. Since the OIF card may be chosen independent of the protocol of the data channel, system 10 enables implementation of highly flexible channel allocation over the wavelength groups of the system, and thus enables efficient use of wavelength group bandwidth.

Figure 5:
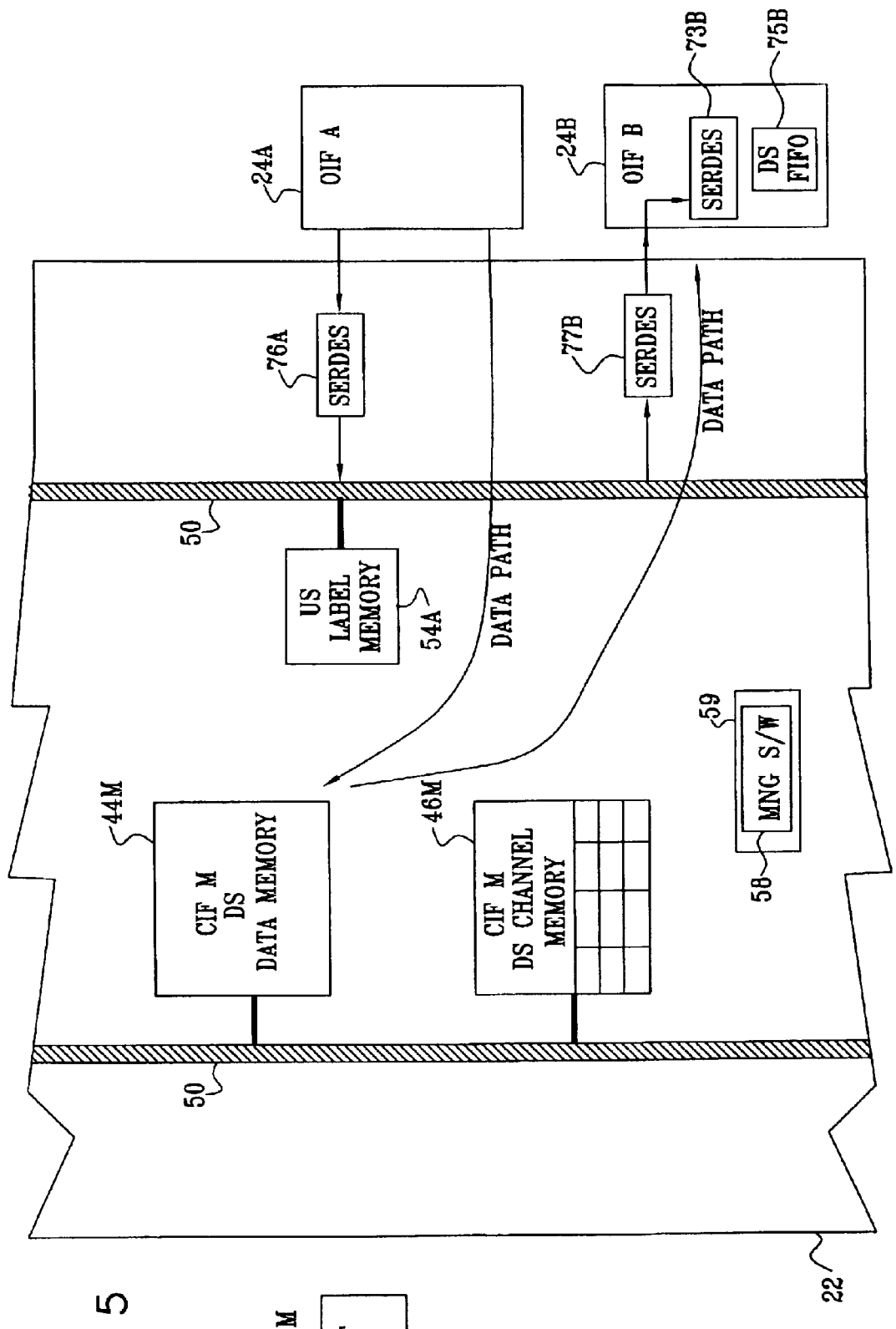
FIG. 5 is a schematic block diagram illustrating elements of the optical distribution system of FIG. 1 used for local routing of upstream data, according to a preferred embodiment of the present invention.

FIG. 5 is a schematic block diagram illustrating elements of system 10 used for local routing of upstream data, according to a preferred embodiment of the present invention. FIG. 5 is generally similar to FIG. 2, but for clarity, elements not involved in locally routing upstream data are not shown in FIG. 5. In addition to transferring upstream and downstream data as described above with respect to FIGS. 3 and 4, system 10 enables one or more upstream data channels from a first OIF card 24, herein termed OIF card 24A, to be locally routed as respective downstream data channels to a second OIF card 24, herein termed OIF card 24B. The local routing may be performed as well as, or in place of, routing to a specific CIF card 20, herein termed CIF card 20M. In the following description, suffixes A, B, and M are appended to identifiers of elements associated respectively with card 24A, card 24B, and card 20M.

To transfer an upstream channel of data from OIF card 24A to become a downstream channel into OIF card 24B, software 58 sets upstream label memory 54A for card 24A to store the upstream channel data in downstream data memory 44M for CIF card 20M. Data is written into memory 44M using channel memory 46M. The data is then written, using management software 58, from memory 44M into FIFO 75B via SERDES logics 77B and 73B, substantially as described above in steps 126 and 128 with reference to FIG. 4. OIF card 24B is then able to transmit the data from FIFO 75B as downstream data, substantially as described above with reference to FIG. 2. It will be appreciated that in order for the data to be written into FIFO 75B, software 58 requires read access to data memory 44M. The read access may be provided by any means known in the art.

It will be understood that by enabling local routing of upstream data to downstream data, ONTs 18 in system 10 may be effectively configured in the form of virtual local area networks (VLANs), the configuration of the VLANs being controlled by the local routing set by software 58.

It will be further understood that preferred embodiments of the present invention may be implemented in a data transfer network other than a passive optical network such as PON 16, such as data transfer networks which are implemented at least partly using a transmission medium such as conductive cabling, and/or transmission over-the-air. All such data networks are included within the scope of the present invention.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. Communications apparatus, comprising:
   a first plurality of client interface units, coupled to network service lines so as to send and receive data carried by the service lines in accordance with respective communication protocols, the client interface units including at least first and second client interface units that communicate with respective first and second channels of the data operating in accordance with different, respective first and second protocols;
   a second plurality of optical interface units, coupled to a passive optical network (PON) and to modulate optical radiation responsive to the data so as to convey the data over the PON; and a connectivity unit, coupled to convey the data between the client interface units and the optical interface units, while mapping the channels to the optical interface units so that data from the first and second channels is carried in alternation by one of the optical interface units to first and second users of the passive optical network communicating respectively in accordance with the first and second protocols, wherein the connectivity unit comprises a first plurality of memories which store routing information for channels of the data sent and received by respective client interface units, and wherein each of the first plurality of memories comprises a downstream label memory which stores the routing information indicative of the optical interface unit, comprised in the second plurality of units, to which downstream data comprised in the channels of the data is to be sent.

2. Apparatus according to claim 1, wherein each of the optical interface units conveys the data from the first and the second channels from the first and the second users of the passive optical network, and wherein the connectivity unit maps the first channel to the first client interface unit and the second channel to the second client interface unit.

3. Apparatus according to claim 1, wherein each of the communication protocols comprises a respective industry-standard communication protocol.

4. Apparatus according to claim 1, wherein the data is transferred in the PON via a time division multiplexed method.

5. Apparatus according to claim 1, wherein each of the optical interface units conveys the data via a respective pair of wavelengths, so that the data is transferred in the PON by a wavelength division multiplexed method.

6. Apparatus according to claim 1, wherein the connectivity unit comprises a second plurality of memories which store routing information for channels of the data sent and received by respective optical interface units.

7. Apparatus according to claim 1, wherein the connectivity unit comprises a memory comprising management software, and wherein the management software conveys the data between the client interface units and the optical interface units in data-units having a predetermined minimum size.

8. Apparatus according to claim 7, wherein the management software inserts channel boundaries in the conveyed data and removes the channel boundaries after the data has been conveyed.

9. Apparatus according to claim 1, wherein the second plurality of optical interface units comprises a first optical interface unit and a second optical interface unit, and wherein the connectivity unit is coupled to convey upstream data comprised in the data from the first optical interface unit as downstream data to the second interface unit, and wherein the upstream and downstream data are comprised in an identical channel.

10. Communications apparatus, comprising:

a first plurality of client interface units, coupled to network service lines so as to send and receive data carried by the service lines in accordance with respective communication protocols, the client interface units including at least first and second client interface units that communicate with respective first and second channels of the data operating in accordance with different, respective first and second protocols;

a second plurality of optical interface units, coupled to a passive optical network (PON) and to modulate optical radiation responsive to the data so as to convey the data over the PON; and a connectivity unit, coupled to convey the data between the client interface units and the optical interface units, while mapping the channels to the optical interface units so that data from the first and second channels is carried in alternation by one of the optical interface units to first and second users of the passive optical network communicating respectively in accordance with the first and second protocols, wherein the connectivity unit comprises a second plurality of memories which store routing information for channels of the data sent and received by respective optical interface units, and wherein each of the second plurality of memories comprises an upstream label memory which stores the routing information indicative of the client interface unit, comprised in the first plurality of units, to which upstream data comprised in the channels of the data is to be sent.

11. Apparatus according to claim 10, wherein the connectivity unit comprises a first plurality of memories which store routing information for channels of the data sent and received by respective client interface units.

12. Apparatus according to claim 10, wherein each of the optical interface units conveys the data from the first and the second channels from the first and the second users of the passive optical network, and wherein the connectivity unit maps the first channel to the first client interface unit and the second channel to the second client interface unit.

13. Apparatus according to claim 10, wherein the data is transferred in the PON via a time division multiplexed method.

14. Apparatus according to claim 10, wherein each of the optical interface units conveys the data via a respective pair of wavelengths, so that the data is transferred in the PON by a wavelength division multiplexed method.

15. Apparatus according to claim 10, wherein the connectivity unit comprises a memory comprising management software, and wherein the management software conveys the data between the client interface units and the optical interface units in data-units having a predetermined minimum size.

16. Apparatus according to claim 15, wherein the management software inserts channel boundaries in the conveyed data and removes the channel boundaries after the data has been conveyed.

17. Apparatus according to claim 10, wherein the second plurality of optical interface units comprises a first optical interface unit and a second optical interface unit, and wherein the connectivity unit is coupled to convey upstream data comprised in the data from the first optical interface unit as downstream data to the second interface unit, and wherein the upstream and downstream data are comprised in an identical channel.

18. A method for transferring data, comprising:

coupling a first plurality of client interface units to network service lines so as to send and receive the data carried by the service lines in accordance with respective communication protocols, the client interface units including at least first and second client interface units that communicate with respective first and second channels of the data operating in accordance with different, respective first and second protocols;

coupling a second plurality of optical interface units to a passive optical network (PON) so as to modulate optical radiation responsive to the data so as to convey the data over the PON;

coupling a connectivity unit between the client interface units and the optical interface units so as to convey the data therebetween; and mapping the channels to the optical interface units so that data from the first and second channels is carried, via the connectivity unit, in alternation by one of the optical interface units to first and second users of the passive optical network communicating respectively in accordance with the first and second protocols, wherein the connectivity unit comprises a first plurality of memories, and comprising storing routing information for channels of the data sent and received by client interface units in the respective memories, and wherein each of the first plurality of memories comprises a downstream label memory which stores the routing information indicative of the optical interface unit, comprised in the second plurality of units, to which downstream data comprised in the channels of the data is to be sent.

19. A method according to claim 18, wherein each of the optical interface units conveys the data from the first and the second channels from the first and the second users of the passive optical network, and wherein the connectivity unit maps the first channel to the first client interface unit and the second channel to the second client interface unit.

20. A method according to claim 18, wherein each of the communication protocols comprises a respective industry-standard communication protocol.

21. A method according to claim 18, and comprising transferring the data in the PON via a time division multiplexed method.

22. A method according to claim 18, wherein each of the optical interface units conveys the data via a respective pair of wavelengths, and comprising transferring the data in the PON by a wavelength division multiplexed method.

23. A method according to claim 18, wherein the connectivity unit comprises a second plurality of memories, and comprising storing routing information for channels of the data sent and received by optical interface units in the respective memories.

24. A method according to claim 18, wherein the connectivity unit comprises a memory comprising management software, and comprising conveying the data between the client interface units and the optical interface units in data-units having a minimum size determined by the management software.

25. A method according to claim 24, and comprising the management software inserting channel boundaries in the conveyed data and removing the channel boundaries after the data has been conveyed.

26. A method according to claim 18, wherein the second plurality of optical interface units comprises a first optical interface unit and a second optical interface unit, and comprising conveying, via the connectivity unit, upstream data comprised in the data from the first optical interface unit as downstream data to the second interface unit, wherein the upstream and downstream data are comprised in an identical channel.

27. A method for transferring data, comprising:

coupling a first plurality of client interface units to network service lines so as to send and receive the data carried by the service lines in accordance with respective communication protocols, the client interface units including at least first and second client interface units that communicate with respective first and second channels of the data operating in accordance with different, respective first and second protocols;

coupling a second plurality of optical interface units to a passive optical network (PON) so as to modulate optical radiation responsive to the data so as to convey the data over the PON;

coupling a connectivity unit between the client interface units and the optical interface units so as to convey the data therebetween; and mapping the channels to the optical interface units so that data from the first and second channels is carried, via the connectivity unit, in alternation by one of the optical interface units to first and second users of the passive optical network communicating respectively in accordance with the first and second protocols, wherein the connectivity unit comprises a second plurality of memories, and comprising storing routing information for channels of the data sent and received by optical interface units in the respective memories, and wherein each of the second plurality of memories comprises an upstream label memory which stores the routing information indicative of the client interface unit, comprised in the first plurality of units, to which upstream data comprised in the channels of the data is to be sent.

28. A method according to claim 27, wherein the connectivity unit comprises a first plurality of memories, and comprising storing routing information for channels of the data sent and received by client interface units in the respective memories.

29. A method according to claim 27, wherein each of the optical interface units conveys the data from the first and the second channels from the first and the second users of the passive optical network, and wherein the connectivity unit maps the first channel to the first client interface unit and the second channel to the second client interface unit.

30. A method according to claim 27, and comprising transferring the data in the PON via a time division multiplexed method.

31. A method according to claim 27, wherein each of the optical interface units conveys the data via a respective pair of wavelengths, and comprising transferring the data in the PON by a wavelength division multiplexed method.

32. A method according to claim 27, wherein the connectivity unit comprises a memory comprising management software, and comprising conveying the data between the client interface units and the optical interface units in data-units having a minimum size determined by the management software.

33. A method according to claim 32, and comprising the management software inserting channel boundaries in the conveyed data and removing the channel boundaries after the data has been conveyed.

34. A method according to claim 27, wherein the second plurality of optical interface units comprises a first optical interface unit and a second optical interface unit, and comprising conveying, via the connectivity unit, upstream data comprised in the data from the first optical interface unit as downstream data to the second interface unit, wherein the upstream and downstream data are comprised in an identical channel.

* * * * *